July 3, 1973 H. MUNGAARD 3,743,538
METHOD OF ATTACHING AN ELECTRODE TO A SEMI-CONDUCTOR ELEMENT
Filed Sept. 16, 1970
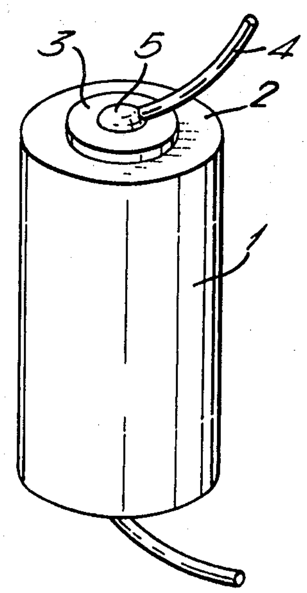

United States Patent Office 3,743,538
Patented July 3, 1973

3,743,538

METHOD OF ATTACHING AN ELECTRODE TO A SEMICONDUCTOR ELEMENT

Hans Mungaard, Langeso, Nordborg, Denmark, assignor to Danfoss A/S, Nordborg, Denmark Filed Sept. 16, 1970, Ser. No. 72,658
Claims priority, application Germany, Sept. 20, 1969, P 19 47 799.7
Int. Cl. B44d 1/18
U.S. Cl. 117—221 6 Claims

ABSTRACT OF THE DISCLOSURE

A method of attaching an electrode to a semiconductor element comprising the steps of applying a contact mixture to the semiconductor element and fusing the mixture to the element. The contact material comprises silver, titanium hydride and a readily oxidizable metal selected from the group consisting of zinc, aluminum, lead, tin and indium. The fusion temperature is above the temperature at which the hydride reduces the oxide of the oxidizable metal.

The invention relates to a method of attaching an electrode to a semiconductor element, particularly one made of oxyceramic material, by applying a contact material containing silver and then fusing; the invention also relates to a semiconductor element produced by the method.

It is known to provide semi-conductor elements with silver electrodes. For this purpose, silver e.g. in paste form (colloidal silver in a suspension of an organic carrier) is applied to a contact surface of the element, and fusion is then carried out. Instead of pure silver, a compound which gives off silver can be applied.

This method cannot however be used in the case of many semi-conductor elements, particularly those made of oxy-ceramic. This kind of semiconductor element, e.g. the PTC-resistor, is however of special technical importance. A known representative of these semiconductor elements is barium titanate ($BaTiO_3$). With this kind of material a troublesome intermediate coating occurs at the contact surface during fusion, and this coating causes a high transfer resistance between the electrode and the semiconductor material on the one hand, while on the other its resistance is frequently dependent upon the direction of the current. It is absolutely necessary to avoid such resistance to transfer particularly in the case of high-duty PTC-resistors, e.g. for motors and the like in which a capacity of several watts, e.g. 25 w., is converted, since otherwise heating up would be concentrated at this transfer zone and an impermissible rise in temperature would result.

It has been found that this high-resistance transfer zone is attributable to an oxidation blocking layer which occurs when the silver is fused on. The only known practical method of eliminating this blocking layer consists in applying a coating of zinc or tin to the fused-on electrode and in warming up the electrode so that the zinc or tin diffuses through it and reduces the oxide material in the blocking layer to an extent such that the troublesome properties of the layer are wholly or partially eliminated. A disadvantage here is however that the fusing operation must be followed by the step of diffusion and a finishing treatment at an elevated temperature. The remaining resistance to transfer is too high for many cases and rises irreversibly with time to as much as 40%.

The object of the invention is to provide a much simpler procedure for producing a semi-conductor element having a fused-on electrode and exhibiting a better transfer behaviour, i.e. having no troublesome blocking layer.

According to the invention, this object is achieved by a readily oxidizable metal and an activator, which reduces the oxide of this metal above a predetermined reaction temperature, being added to the contact material to be applied, and by fusion being carried out at a temperature above that of the reaction.

In this method, the formation of a blocking layer during fusion is suppressed. Subsequent diffusion of a metal for eliminating the blocking layer can be dispensed with. The readily oxidizable metal prevents the formation of an oxidation blocking layer i.e. it has the effect of immediately converting all the troublesome oxides that form into the oxide of the metal in question which gives no trouble. Here, of course, it has to be borne in mind that a readily oxidizable metal has an oxide skin in its normal condition, i.e. as the result of the effect of the atmosphere. The metal alone is intended to effect the required reduction. This difficulty however is overcome by the use of the activator. The activator takes effect only during fusion, i.e. when its reaction temperature is exceeded. It removes the oxide skin on the metal by reduction, so that the metal can develop its full effect in the area of the transfer zone. A very low transfer resistance results and this undergoes no appreciable changes at a later stage when the semiconductor element is exposed to operating conditions.

Special advantages accrue if titanium hydride ($TiH_2$) is used as the activator and if the fusion temperature is higher than the decomposition temperature of the activator. If titanium hydride decomposes at approximately 450° C., the oxide skin on the readily oxidizable metal is reduced by the liberated hydrogen. Harmless titanium then remains in the coating of the electrode, while hydrogen or water in vapour form can escape. Also, the decomposition temperature is below a value which can be used in the fusion procedure. A further activator that can be used is zirconium hydride.

In accordance with a further feature of the invention, use is made of a readily oxidizable metal, the melting point of which is below the fusion temperature. If the metal melts during fusion, molten metal breaks through the oxide skin and is available for reduction at the transfer zone. Thus, a smaller quantity of activator will suffice. The metal has a greater reduction activity during fusion and therefore leads to a very uniform transfer at the contact zones. If the melting temperature of the metal is below the reaction temperature of the activator, reduction is initiated even at a relatively low temperature.

A readily oxidizable metal that is eminently suitable in practice is zinc having a melting point of 420° C. Other metals that can be used are lead (327° C.), tin (232° C.) or indium (156° C.); use can however also be made of metal alloys that melt at a low temperature, e.g. 25% indium+75% lead (227–264° C.).

Another useful readily oxidizable metal is aluminium. Although the melting point of aluminium—660° C.—cannot generally be reached during fusion, it suffices to reduce the skin of oxide on the aluminium by means of the activator. Aluminium is inexpensive and is commercially available in the form of a powder that can be immediately used.

Expediently, the admixed constituents are used in powder form, and particularly in colloidal form. In this way, very uniform distribution and a large reaction surface are achieved. The pulverulent constituents can be vary advantageously mixed with a silver paste, known per se. Since colloidal silver is contained in the silver paste, the three stated constituents of the mixture are distributed extremely uniformly.

In practice it has been found advantageous to mix roughly the same volumes of the readily oxidizable metal and of the activator. Silver should of course constitute the major part of the volume of the mixture as a whole. For example, 70–85% by volume of silver and 30–15% by volume of readily oxidizable material and activator can be mixed together.

A very non-critical contact material which is particularly well suited for mass-production operations consists of 80% by volume of silver in paste form, 10% by volume of zinc and 10% by volume of titanium hydride.

Advantageously, the fusion temperature should be between 450 and 600° C., and preferably between 500 and 550° C. At these temperatures the decomposition temperature of the titanium hydride is exceeded on the one hand, while on the other the temperature reached is still not high enough to result in other undesirable reactions. Fusion times of 10–20 minutes have proved efficacious.

A semi-conductor element produced by the method of the invention is characterized in that, apart from silver, the electrode also contains titanium and a readily oxidizable metal or oxides thereof. The conductivity of the silver is not appreciably reduced by these substances, and there is no interference with the resistance of the contact. On the other hand, these substances impart greater thickness and srength to the electrode.

An embodiment of the example is illustrated in the drawing, a PTC-resistor 1 made of oxy-ceramic material, barium titanate in this case, carries at its two end faces 2 a fused-on electrode 3, which consists substantially of silver. A connecting wire 4 is attached to this electrode by means of a soldered joint 5.

A commercial silver paste (colloidal silver in an organic binding agent) was mixed with zinc powder and titanium hydride powder to produce the electrode. The titanium hydride powder and the zinc powder were dried at 145° C. for 30 minutes before mixing. This contact material was then applied to the contact surface 2 in the form of the electrode 3 and was then fused on at 500° C., this operation taking 10 minutes.

In the case of a barium titanate element having a composition resistance of 60 ohms, a virtually unchanged total resistance was obtained after attachment of the electrodes when the volume of silver was between 65 and 95%, the zinc and titanium hydride contents being equal in volume to each other. By increasing the fusion time to 15 minutes, similar values were achieved with a silver-content of 80–90%.

In another embodiment, aluminium powder was used instead of zinc powder. In this case, resistances that were only slightly above the original value were obtained when, with the volumes of aluminium and titanium hydride equal to each other, the volume of silver amounted to 70–85%.

I claim:

1. A method of attaching an electrode to a semi-conductor element comprising the steps of providing a contact mixture comprising silver, titanium hydride, and a readily oxidizable metal selected from the group zinc, aluminum, lead, tin and indium, applying said contact mixture to said element, and fusing said contact mixture to said element at a fusion temperature above the temperature at which said titanium hydride reduces the oxide of said oxidizable metal.

2. A method according to claim 1 wherein the melting point of said oxidizable metal is below said fusion temperature.

3. A method according to claim 1 wherein said fusion temperature is between 450° C. and 600° C.

4. A method according to claim 1 wherein said fusing step is from 10 to 20 minutes.

5. A method according to claim 1 wherein said contact mixture comprises by volume 70 to 85% silver.

6. A method according to claim 5 wherein said contact mixture is by volume approximately 80% silver in paste form, 10% zinc and 10% titanium hydride.

References Cited

UNITED STATES PATENTS

| | | | |
|---|---|---|---|
| 2,961,416 | 11/1960 | Boldrey et al. | 252—514 |
| 3,547,835 | 12/1970 | Short | 117—227 |
| 2,521,610 | 9/1950 | Shobert | 117—221 X |
| 3,409,467 | 11/1968 | Foley | 317—234 L |

FOREIGN PATENTS

| | | | |
|---|---|---|---|
| 1,029,953 | 5/1958 | Germany | 252—514 |

CAMERON K. WEIFFENBACH, Primary Examiner

U.S. Cl. X.R.

117—227; 252—514, 520; 317—234 L